(12) United States Patent
Fukano et al.

(10) Patent No.: US 8,030,813 B2
(45) Date of Patent: Oct. 4, 2011

(54) SERVO MOTOR

(75) Inventors: Yoshihiro Fukano, Moriya (JP); Shoichi Makado, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/255,798

(22) Filed: Oct. 22, 2008

(65) Prior Publication Data

US 2009/0121590 A1    May 14, 2009

(30) Foreign Application Priority Data

Nov. 14, 2007   (JP) ................................ 2007-295635

(51) Int. Cl.
*H02K 7/10* (2006.01)
(52) U.S. Cl. ........................................ 310/75 B; 310/83
(58) Field of Classification Search ................ 310/75 B, 310/83
See application file for complete search history.

(56) References Cited

U.S. PATENT DOCUMENTS 6,603,228 B1 * 8/2003 Sato ................................ 310/83
7,500,652 B2 * 3/2009 Kawakami et al. ............ 254/334

FOREIGN PATENT DOCUMENTS

| CN | 1993287 A | 7/2007 |
|---|---|---|
| DE | 86 28 703 U1 | 2/1987 |
| DE | 195 32 590 A1 | 3/1997 |
| DE | 10 2006 009 674 A1 | 12/2006 |
| JP | 04340375 A * | 11/1992 |
| JP | 05122890 A * | 5/1993 |
| JP | 09191611 A * | 7/1997 |
| JP | 11-332180 | 11/1999 |
| JP | 2002-272057 | 9/2002 |
| WO | WO 2006059380 A1 * | 6/2006 |

OTHER PUBLICATIONS

Office Action issued Aug. 18, 2010, in Korean Patent Application No. 10-2008-0112830, filed Nov. 13, 2008 (with partial English-language Translation).

* cited by examiner

*Primary Examiner* — Quyen Leung
*Assistant Examiner* — Leda Pham
(74) *Attorney, Agent, or Firm* — Oblon, Spivak, McClelland, Maier & Neustadt, L.L.P.

(57) ABSTRACT

A servo motor is equipped with a rotary shaft, a rotor rotated integrally with the rotary shaft, a stator that is separated a predetermined distance from and disposed in confronting relation to the rotor, and an angle detecting device that detects an angle of rotation of the rotary shaft. On a counter-load side end, which is opposite to a load side end of the rotary shaft, an operating member is provided, which enables the rotary shaft to be rotated manually from an exterior location.

10 Claims, 2 Drawing Sheets

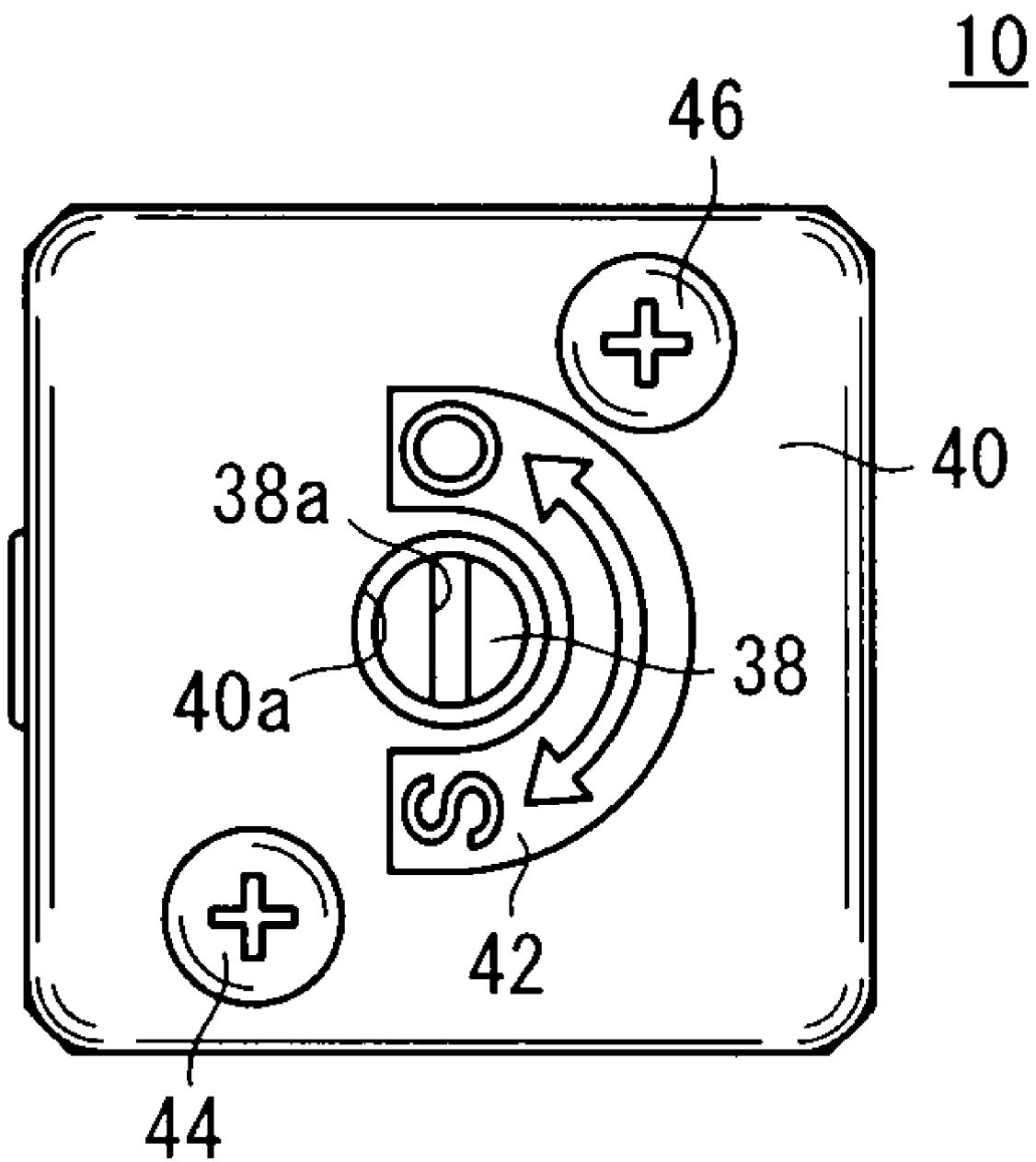

_US 8,030,813 B2_

SERVO MOTOR

BACKGROUND OF THE INVENTION

1. Field of the Invention

The present invention relates to a servo motor having an operating member, by which a rotary shaft of the servo motor is capable of being rotationally operated by hand (manually) from a location outside of the servo motor.

2. Description of the Related Art

A servo motor has been utilized, for example, as a drive source for a robot or an actuator or the like. In this type of servo motor, a detecting device for detecting an angle of rotation of a rotary shaft is provided, together with a rotor that rotates integrally with the rotary shaft, and a stator, which is separated a given distance and arranged in confronting relation to the rotor. (See, Japanese Laid-Open Patent Publication No. 11-332180.)

Normally, such a servo motor is driven by being electrically energized from an external power source. However, in the event that electricity is interrupted as a result of abnormal stoppage of the apparatus on which the servo motor is mounted, it becomes difficult to operate (actuate) the servo motor. Consequently, in such a state, methods have been considered for actuating the servo motor by application of an external force at the side (load side) of the apparatus that is driven by the servo motor.

However, generally, a servo motor is constructed such that the gear ratio thereof is elevated, whereby the rotational torque of the servo motor is increased, so that the thrust force provided by a feed screw can be enlarged. Owing thereto, in many cases, manual operation of the apparatus side, or even carrying out fine positional adjustments, is quite difficult, and cases can also be presumed in which manual operations of the servo motor are completely impossible. In the case that manual operations from the apparatus side cannot be performed, an operation is required by which electrical energy is applied temporarily to the servo motor. However, such an operation is burdensome, and naturally, cases also exist in which the supply of electrical energy may be impossible.

SUMMARY OF THE INVENTION

A general object of the present invention is to provide a servo motor, which can be easily operated manually from an exterior location even at times, for example, when electrical energy is not supplied thereto.

According to a first embodiment of the present invention, a servo motor is provided, which is equipped with a detector for detecting an angle of rotation of a rotary shaft, and wherein an operating member, which enables the rotary shaft to be rotationally operated by hand (manually) from an exterior location, is disposed on the rotary shaft.

In accordance with such a structure, for example, even in the event that electrical energization of the servo motor is interrupted, the rotary shaft can easily be rotated from the outside via the aforementioned operating member. For example, even in the case of a servo motor, which is constructed with an elevated gear ratio whereby the rotational torque of the servo motor is increased so that the thrust force provided by a feed screw can be enlarged, the rotary shaft is capable of being operated on easily by hand (manually) via the operating member irrespective of the gear ratio on the apparatus side thereof, and ease of handling can be improved.

In this case, the operating member is arranged in the interior of a hole that is formed on the outer surface of the chassis (casing) of the servo motor. When the operating member is flush with or recessed inwardly from the outer surface of the chassis, the servo motor can be made smaller in size, and the degree of freedom for installing the servo motor as well as the outer appearance thereof can be improved.

Further, when the operating member is disposed on a counter-load side, on a side opposite to the load side that forms one end of the rotary shaft, because manual operations can be performed while visually confirming the rotating state of the rotary shaft, operability can further be improved.

Moreover, when the operating member is affixed detachably to an end of the aforementioned counter-load side of the rotary shaft, the rotary shaft is not changed with respect to the various specifications of apparatuses to which the servo motor is applied, and such specifications can be responded to simply by changing the operating member, whereby versatility of the servo motor can be improved.

Still further, when the operating member is disposed coaxially with the rotary shaft, because rotations of the operating member and the rotary shaft coincide with each other, operations can be performed easily while visually confirming the rotational state of the rotary axis.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is an outline front surface view of the servo motor shown in FIG. 2.

DESCRIPTION OF THE PREFERRED EMBODIMENTS

Figure 1:
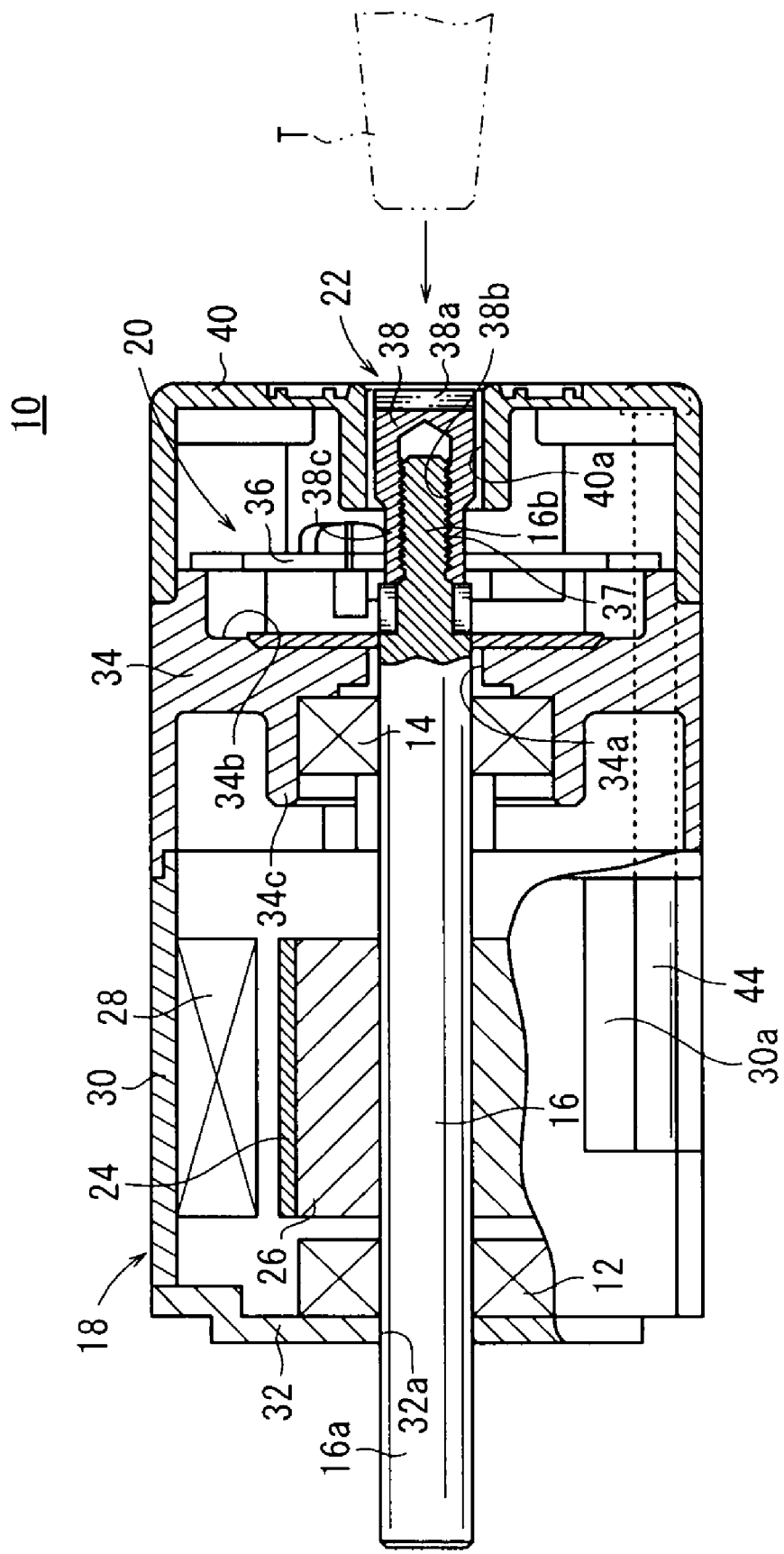
FIG. 1 is a partial outline side surface view along an axial direction of a servo motor according to an embodiment of the present invention.

A detailed description shall be given below with reference to the accompanying drawings of a preferred embodiment concerning the servo motor according to the present invention.

The servo motor 10 according to the present embodiment is mounted onto an apparatus (load) made up, for example, of a small scale electrical gripper (not shown) for gripping an object to be gripped, and is utilized as a drive source for opening and closing the gripper.

The servo motor 10 is constituted by a motor 18, which rotatably drives a rotary shaft (motor shaft) 16 supported rotatably by a pair of bearings 12, 14 disposed therein and separated by a predetermined distance, and which outputs a motive force to the exterior of the servo motor 10, a detector 20 that detects an angle of rotation (rotational position, rotational phase) of the rotary shaft 16, and a manual operating section 22 for operating the rotary shaft manually from an exterior location.

The motor 18 is equipped with the rotary shaft 16, a rotor 26, which is capable of rotating integrally with the rotary shaft 16 as a result of being affixed to an outer circumferential surface of the rotary shaft 16, and a stator 28, which is separated a predetermined distance from and arranged in confronting relation to the rotor 26, the stator 28 surrounding an outer circumferential side of the rotor 26. A permanent magnet 24 is disposed on the outer circumferential side of the rotor 26.

The motor 18 further comprises a roughly externally rectangular shaped tubular bracket 30 that supports the stator 28 on an inner surface side thereof, a load side bracket 32 disposed on an output side (load side end 16*a*) of the rotary shaft 16 that covers an opening of the bracket 30, and a counter-load side bracket 34 that covers an opening of the counter-load side of the bracket 30 (a side opposite to the side of the load side bracket 32). The bracket 30 and the load side bracket 32 may be formed together integrally, as may be the counter-load side bracket 34 in a similar manner.

The load side bracket 32 serves to support the bearing 12 and includes a hole 32*a* formed in the center thereof. The load side end 16*a* of the rotary shaft 16 projects outside of the load side bracket 32 through the hole 32*a*.

The counter-load side bracket 34 includes a hole 34*a* in the center thereof through which the rotary shaft 16 penetrates. The counter-load side bracket 34 supports the bearing 14 at an inner circumferential side of an annular projection 34*c* formed on one surface side (rotor 26 side) thereof in the axial direction, whereas an angle detecting device 36 constituting the detector 20 is supported by a recess 34*b* disposed on the other surface side of the counter-load side bracket 34.

The detector 20 includes the angle detecting device 36 for detecting an angle of rotation of the rotary shaft 16 and, for example, is capable of transmitting a detected angle to an external controller (not shown), as well as receiving feedback control signals from the controller. For example, a rotary encoder, a resolver or the like can be used as the angle detecting device 36.

The manual operating section 22 includes an operating member 38 having a substantially outward cylindrical columnar shape and a cover bracket 40 that covers the recess 34*b* side of the counter-load side bracket 34. The operating member 38 is connected coaxially with the rotary shaft 16 by screw-engagement onto a screw portion 37 which is formed on the counter-load side end 16*b* that is opposite to the output side of the rotary shaft 16. A cylindrical hole (hole) 40*a*, which surrounds the outer circumferential side of the operating member 38, is formed in the center of the cover bracket 40.

A groove 38*a*, which enables an operator to easily operate the operating member 38 by means of a tool T, such as a screwdriver or the like, is formed in the end surface of the operating member 38. Further, a cylindrical nut portion 38*c* with threads 38*b* formed on an inner circumferential side thereof is disposed on the rotary shaft 16 side of the operating member 38. The operating member 38 is connected to the rotary shaft 16 by screw-engagement of the cylindrical nut portion 38*c* onto the screw portion 37 of the rotary shaft 16. Naturally, connection of the operating member 38 and the rotary shaft 16 may be accomplished by other means apart from threaded engagement, such as methods using a fitting, a key or the like, as long as the operating member 38 and the rotary shaft 16 are capable of being mutually affixed to each other. Further, it is preferable to provide a stop screw, a key or the like (not shown) to stop the operating member 38 from turning around the rotary shaft 16 reliably, so as not to loosen the fastened state between the cylindrical nut portion 38*c* and the screw portion 37, at times when the operating member 38 is operated on by the tool T.

As understood from FIG. 1, the cover bracket 40 functions to accommodate the detector 20 inside of the chassis of the servo motor 10 and to protect the detector 20. Further, the cylindrical hole 40*a* is formed at a sufficient depth so that the operating member 38 does not project outwardly therefrom. In the case of the present embodiment, the operating member 38 is disposed in a somewhat recessed state inside of the cylindrical hole 40*a*, so as to be recessed inwardly from the outer surface of the cover bracket 40. Further, as shown in FIG. 2, on the outer surface of the cover bracket 40, a mark 42 consisting of an arrow or the like and showing the directions of operation of the operating member 38 is applied around the peripheral edge of the centrally disposed cylindrical hole 40*a*.

In FIG. 2, reference characters 44 and 46 indicate attachment bolts for integrally connecting each of the brackets 30, 32, 34, 40 that constitute the chassis of the servo motor 10, by insertion through the brackets in the axial direction of the servo motor 10. For example, the attachment bolts 44, 46 are inserted through holes 30*a* provided in the corners of the bracket 30 and then screw-engaged and affixed into non-illustrated threaded portions (see FIG. 1).

In accordance with the servo motor 10 according to the present embodiment, which is constructed as described above, the operating member 38 (manual operating section 22), through which the rotary shaft 16 can be rotationally operated by hand from the exterior location, is connected to the counter-load side end 16*b* of the rotary shaft 16. That is, the servo motor 10 is configured so as to enable operation of the rotary shaft from the exterior of the servo motor 10. Owing thereto, in a servo motor constructed with an elevated gear ratio whereby the rotational torque of the servo motor is increased so that the thrust force provided by a feed screw can be enlarged, for example, in the event that the electrical power for energizing the servo motor 10 is interrupted, it is unnecessary when operating the servo motor 10 for an external force to be applied to the apparatus side (load side) thereof to operate the servo motor 10, as in the aforementioned conventional structure. In addition, irrespective of the gear ratio (amplification rate of the rotational torque), a pulley ratio or the like of the apparatus, the rotary shaft 16 can be easily operated manually via the operating member 38, and ease of handling can be improved substantially.

In this case, because the operating member 38 is connected coaxially with respect to the rotary shaft 16 and the rotations of the operating member 38 and the rotary shaft 16 coincide with each other, manual operations can be carried out easily while visually confirming the rotating (operational) state of the rotary shaft 16, and operability is further enhanced. Moreover, in the servo motor 10, the operating member 38 (the operating surface thereof) is recessed from the chassis outer surface (cover bracket 40) and arranged inside of the cylindrical hole 40*a*. Owing thereto, the servo motor 10 can be further reduced in size, while effectively preventing the operating member 38 from being operated unintentionally, and the degree of freedom for installing the servo motor 10 as well as the outer appearance thereof can be improved. Substantially the same effects can be achieved even if the operating member 38 is constructed to be flush with the outer surface of the chassis.

Further, in the servo motor 10, because the operating member 38 is provided inside of the chassis, it is unnecessary for dedicated operating functions to be provided in each of the apparatuses on which the servo motor 10 is mounted, thereby enabling conservation of space and a reduction in cost. In addition, because the operating member 38 is connected to the rotary shaft 16 by the cylindrical nut portion 38*c*, the operating member 38 can easily be attached to and detached from the rotary shaft 16. Owing thereto, corresponding to differing specifications of the apparatuses to which the servo motor 10 may be applied, such specifications can be responded to simply by changing the axial length or the like of the operating member 38, without changes to the rotary shaft 16, and hence the versatility of the servo motor 10 is high.

Further, in a state of being electrically energized, naturally, the influence of size of the rotational torque of the servo motor itself is received, however, because manual operations also can be carried out sufficiently, even in an abnormal state in cases where an operational malfunction occurs in the apparatus or the like, the rotary shaft 16 can still be operated reliably.

The present invention is not limited to the above-described embodiment. It is a matter of course that the invention may be freely modified within a scope which does not deviate from the essence of the present invention.

For example, the shape of the groove 38a which is disposed in the operating member 38 can be modified appropriately, and shapes apart from grooves may be used. For example, a plus-sign shape, a hexagonal shape, or the like may also be used, as long as such shapes enable the rotary shaft 16 to be operated on from an exterior location.

Further, according to conditions of use of the servo motor 10, the operating member 38 can naturally be disposed so as to project from the outer surface of the servo motor 10.

Furthermore, the structures of the motor and detector are not limited to the configuration of the aforementioned embodiment, and it goes without saying that any of various other structures could be adopted.

What is claimed is:

1. A servo motor comprising:
a detector for detecting an angle of rotation of a rotary shaft including a threaded screw portion at a counter-load side; and
an operating member, which enables the rotary shaft to be rotationally operated manually from an exterior location, disposed on the counter-load side, on a side opposite to a load side that forms one end of the rotary shaft,
wherein the operating member includes a groove to receive a tool by the tool being inserted into the groove, to operate the operating member,
wherein the operating member is affixed detachably to an end of the counter-load side of the rotary shaft by being screw engaged with the threaded screw portion of the rotary shaft at the counter-load side, and
wherein the groove is formed in an end surface of the operating member to receive the tool coaxially with the rotary shaft.

2. The servo motor according to claim 1, wherein the operating member is arranged in an interior of a hole that is formed on an outer surface of a casing of the servo motor, the operating member being flush with or recessed inwardly from the outer surface of the casing.

3. The servo motor according to claim 1, further comprising an engagement portion, with which the tool engages, formed on the operating member, and
wherein when the rotary shaft is rotationally operated by engaging the tool with the engagement portion, a rotation center of the operating member is disposed coaxially with a rotation center of the rotary shaft.

4. The servo motor according to claim 2, further comprising an engagement portion, with which the tool engages, formed on the operating member,
wherein when the rotary shaft is rotationally operated by engaging the tool with the engagement portion, a rotation center of the operating member is disposed coaxially with a rotation center of the rotary shaft, and
wherein a surface on which the engagement portion is disposed is flush with or recessed inwardly from the outer surface of the casing.

5. The servo motor according to claim 2, wherein the operating member comprises a cylindrical nut portion, which is screw-engaged with the screw portion disposed on an end of the rotary shaft, the cylindrical nut portion being inserted into the hole.

6. A servo motor comprising:
a detector for detecting an angle of rotation of a rotary shaft including a threaded screw portion at a counter-load side; and
an operating member, which enables the rotary shaft to be rotationally operated manually from an exterior location, disposed on the counter-load side, on a side opposite to a load side that forms one end of the rotary shaft, by being screw engaged with the threaded screw portion of the rotary shaft at the counter-load side,
wherein the operating member is affixed detachably to an end of the counter-load side of the rotary shaft by a tool being inserted into a groove, and
wherein the operating member is arranged in an interior of a hole that is formed on an outer surface of a casing of the servo motor, the operating member being flush with or recessed inwardly from the outer surface of the casing.

7. The servo motor according to claim 6, further comprising an engagement portion, with which the tool engages, formed on the operating member,
wherein when the rotary shaft is rotationally operated by engaging the tool with the engagement portion, a rotation center of the operating member is disposed coaxially with a rotation center of the rotary shaft, and
wherein a surface on which the engagement portion is disposed is flush with or recessed inwardly from the outer surface of the casing.

8. The servo motor according to claim 6, wherein the operating member comprises a cylindrical nut portion, which is screw-engaged with the screw portion disposed on an end of the rotary shaft, the cylindrical nut portion being inserted into the hole.

9. A servo motor comprising:
a detector for detecting an angle of rotation of a rotary shaft including a threaded screw portion at a counter-load side; and
an operating member, which enables the rotary shaft to be rotationally operated manually from an exterior location, disposed on the counter-load side, on a side opposite to a load side that forms one end of the rotary shaft,
wherein the operating member is affixed detachably to an end of the counter-load side of the rotary shaft by being screw engaged with the threaded screw portion of the rotary shaft at the counter-load side,
and further comprises an engagement portion, with which a tool engaged, formed on the operating member by the tool being inserted into a groove, and
wherein when the rotary shaft is rotationally operated by engaging the tool with the engagement portion, a rotation center of the operating member is disposed coaxially with a rotation center of the rotary shaft.

10. A servo motor comprising:
a detector for detecting an angle of rotation of a rotary shaft including a threaded screw portion at a counter-load side; and
an operating member, which enables the rotary shaft to be rotationally operated manually from an exterior location, disposed on the counter-load side, on a side opposite to a load side that forms one end of the rotary shaft by a tool being inserted into a groove,
wherein the operating member is affixed detachably to an end of the counter-load side of the rotary shaft, and
wherein the operating member comprises a threaded portion, which is screw-engaged with the threaded screw portion disposed on the counter-load side of the rotary shaft.

* * * * *